US010068585B2

(12) United States Patent
Misawa et al.

(10) Patent No.: US 10,068,585 B2
(45) Date of Patent: Sep. 4, 2018

(54) ECHO CANCELLER DEVICE

(71) Applicant: AMENITY RESEARCH INSTITUTE CO., LTD., Hachioji-shi, Tokyo (JP)

(72) Inventors: Eiji Misawa, Tokyo (JP); Toshio Yagi, Tokyo (JP); Yasumasa Shibata, Tokyo (JP); Hiroyuki Toyozumi, Tokyo (JP); Kiyotsugu Arai, Tokyo (JP); Katsuaki Satoh, Tokyo (JP)

(73) Assignee: AMENITY RESEARCH INSTITUTE CO., LTD., Tokyo (JP)

( * ) Notice: Subject to any disclaimer, the term of this patent is extended or adjusted under 35 U.S.C. 154(b) by 0 days.

(21) Appl. No.: 15/327,170

(22) PCT Filed: Jul. 24, 2015

(86) PCT No.: PCT/JP2015/071146
§ 371 (c)(1),
(2) Date: Jan. 18, 2017

(87) PCT Pub. No.: WO2016/013667
PCT Pub. Date: Jan. 28, 2016

(65) Prior Publication Data
US 2017/0178663 A1    Jun. 22, 2017

(30) Foreign Application Priority Data

Jul. 24, 2014    (JP) ................. 2014-150677

(51) Int. Cl.
*G10L 21/0232*  (2013.01)
*G10L 15/22*    (2006.01)
(Continued)

(52) U.S. Cl.
CPC .......... *G10L 21/0232* (2013.01); *G10L 13/00* (2013.01); *G10L 15/22* (2013.01);
(Continued)

(58) Field of Classification Search
CPC ..... G10L 21/0232; G10L 15/22; G10L 13/00; G10L 2021/02163; G10L 2021/02082; H04R 3/02
(Continued)

(56) References Cited

U.S. PATENT DOCUMENTS 6,185,301 B1 * 2/2001 Muraoka ................. H04B 3/23
370/290
9,595,997 B1 * 3/2017 Yang ........................ H04B 3/23
(Continued)

FOREIGN PATENT DOCUMENTS

JP    07-074680    3/1995
JP    10-242891    9/1998
(Continued)

OTHER PUBLICATIONS

International Search Report, dated Aug. 18, 2015 by the Japan Patent Office (JPO), in the corresponding International Application No. PCT/JP2015/071146.

*Primary Examiner* — Edwin S Leland, III
(74) *Attorney, Agent, or Firm* — Greenblum & Bernstein, P.L.C.

(57) ABSTRACT

An echo canceller device is provided with a first filter unit that generates a first output signal $y1(k)$ by filtering a first input signal $x1(k)$ with a filter coefficient $h(k)$, an adaptation unit that modifies the filter coefficient $h(k)$ on the basis of an adaptation algorithm so that a first error signal $e1(k)$ becomes small, a first delaying unit that delays a first objective signal $d1(k)$ by a certain time period $\tau$ and outputs the signal as a second objective signal $d2(k)$, a second delaying unit that delays the first input signal $x1(k)$ by the certain time period $\tau$ and outputs the signal as a second input signal $x2(k)$, and a second filter unit that generates a second output signal $y2(k)$ by filtering the second input signal $x2(k)$ by the filter coefficient $h(k)$ modified by the adaptation unit.

9 Claims, 5 Drawing Sheets

(51) Int. Cl.
  *G10L 13/00* (2006.01)
  *H04R 3/02* (2006.01)
  *G10L 21/0208* (2013.01)
  *G10L 21/0216* (2013.01)
(52) U.S. Cl.
  CPC ...... *H04R 3/02* (2013.01); *G10L 2021/02082* (2013.01); *G10L 2021/02163* (2013.01)
(58) Field of Classification Search
  USPC .......................................................... 704/226
  See application file for complete search history.

(56) References Cited

U.S. PATENT DOCUMENTS

| | | | | |
|---|---|---|---|---|
| 2001/0055985 | A1* | 12/2001 | Matt | H04M 9/082 455/570 |
| 2002/0126855 | A1* | 9/2002 | Terada | H04M 9/082 381/93 |
| 2006/0136203 | A1* | 6/2006 | Ichikawa | G10L 21/0208 704/226 |
| 2008/0085009 | A1* | 4/2008 | Merks | H04M 9/082 381/66 |
| 2008/0240457 | A1* | 10/2008 | Inoue | G10K 11/178 381/71.4 |
| 2011/0091031 | A1* | 4/2011 | Taniguchi | H04M 9/082 379/406.08 |
| 2016/0019909 | A1* | 1/2016 | Shi | H04M 9/082 704/226 |
| 2017/0178663 | A1* | 6/2017 | Misawa | G10L 21/0232 |

FOREIGN PATENT DOCUMENTS

| | | |
|---|---|---|
| JP | 2002-135173 | 5/2002 |
| JP | 2002-204175 | 7/2002 |
| JP | 2002-217793 | 8/2002 |
| JP | 2009-218849 | 9/2009 |
| JP | 5373473 | 9/2013 |

\* cited by examiner

ECHO CANCELLER DEVICE

TECHNICAL FIELD

The present invention relates to an echo canceller device that eliminates echo signals generated when a voice reproduced from a speaker is captured by a microphone.

BACKGROUND ART

Recently, cases of using voice recognition as a means for operating apparatuses have been increasing due to the improvement in the recognition performance. In the field of automobiles in particular, operations with voice recognition without using hands while driving has drawn an attention in view of safety.

In a car navigation system, for example, various kinds of information such as map information, various kinds of accompanying information thereof, and entertainment information are collected, and operations of apparatuses based on such information are executed by voice recognition. That is, the car navigation system controls the related apparatuses while conversing with the user including the driver. In such case, the navigation system takes in charge of the main function of controlling communications with the users.

In this case, the navigation system is required to accurately recognize the words uttered from the user in order to converse with the user correctly and give control instructions without mistakes.

For that, the navigation system is provided with an echo canceller device which, when a guidance speech uttered from the system itself is returned as an echo signal, eliminates it from voice signals of the user (see Patent Literature 1, for example).

FIG. 4 is a block diagram showing an echo canceller device of Related Technique 1. Hereinafter, explanations will be provided based on that drawing.

An echo canceller device 80 of Related Technique 1 is mounted into a car navigation system 90. The navigation system 90 includes a speaker 91, a microphone 92, a voice recognition unit 93, a main control unit 94, a guidance speech generation unit 95, and the like.

The echo canceller device 80 eliminates an echo signal y'(k) that is generated when the voice reproduced from the speaker 91 is captured by the microphone 92. Note here that the signal reproduced from the speaker 91 is defined as an input signal x(k), the signal including the echo signal y'(k) is defined as a objective signal d(k), and "k" is a variable expressing discrete time.

In this case, the echo canceller device 80 includes: a filter unit 81 that generates an output signal y(k) through filtering the input signal x(k) with a filter coefficient h(k); a subtraction unit 82 that inputs the objective signal d(k) and the output signal y(k) and outputs an error signal e(k) that is the difference therebetween; and an adaptation unit 83 that modifies the filter coefficient h(k) so as to reduce the error signal e(k) based on an adaptation algorithm.

The voice uttered by the user 100 is captured by the microphone 92 and transformed into a transmission signal Sin, which is A/D-converted by an A/D converter, not shown, transformed into a transmission signal Sout via the echo canceller device 80, and outputted to the voice recognition unit 93. The voice recognition unit 93 decrypts the transmission signal Sout with the voice recognition algorithm, and conveys the decrypted information to the main control unit 94. The main control unit 94 determines a proper guidance speech based on the decrypted information, and conveys it to the guidance speech generation unit 95. The guidance speech generation unit 95 performs voice synthesis of the guidance speech, and outputs it as a reception signal Rin. The reception signal Rin is D/A-converted by a D/A converter, not shown, to be a reception signal Rout, and reproduced from the speaker 91.

As shown in the drawing, the echo canceller device 80 suppresses the sound echo by the signal processing using an adaptation filter. The principle of the echo canceller will be described. The relation of the input signal x(k) reproduced by the speaker 91 and the echo signal y'(k) received by the microphone 92 can be expressed as y'(k)=x(k)*h'(k) ("*" shows convolution operation) by using impulse response h'(k) of the inside of a car. Thus, the echo canceller device 80 acquires a filter coefficient h(k) that is an estimated value of the impulse response h'(k), generates the output signal y(k) that is an estimated echo signal based thereupon, and subtracts it from the objective signal d(k) captured by the microphone 92 to prevent the sound echo. There is chronological fluctuation in the impulse response h'(k) of the inside of the car due to movement of the person, open/close of the doors and windows, or the like, so that the adaptation unit 83 is used for the estimation thereof. The adaptation unit 83 successively modifies the filter coefficient h(k) so as to minimize the power of the error signal e(k).

Note that in addition to the echo signal y'(k), the objective signal d(k) includes a speaker signal s(k) from the user 100, a noise n(k) such as the surrounding noise, etc. Further, the echo canceller device 80 also includes a delay adjustment unit 85 that adjusts the time difference between the input signal x(k) and the objective signal d(k), a noise suppression unit 86 that suppresses the noise n(k) and the like included in the error signal e(k), and the like.

Patent Literature 1: JP No. 5373473 B
Patent Literature 2: Japanese Unexamined Patent Publication 2002-204175

However, there are following issues such as (1), (2), and (3) with the echo canceller device 80 of Related Technique 1.

(1) The adaptation unit 83 requires a specific learning time for the determination of the optimum filter coefficient h(k). Thus, the filter coefficient h(k) is not converged yet immediately after a guidance speech is uttered from the speaker 91, so that the echo signal y'(k) cannot be eliminated completely and a residual echo may be generated. For example, such phenomenon tends to occur in a case of a first guidance speech after the echo canceller device 80 starts an operation, in a case where the impulse response h'(k) changes greatly between an end of a guidance speech and a guidance speech is started again, etc.

(2) The larger the noise n(k) becomes, the more difficult it becomes to acquire the filter coefficient h(k) that is the estimated value of the impulse response h'(k). Especially, when the noise n(k) become larger than the echo signal y'(k) and the echo signal y'(k) is buried in the noise n(k), it is almost impossible to estimate the impulse response h'(k) that is a transfer function with which the echo signal y'(k) reaches the microphone 92.

(3) When the user 100 conducts a mute operation or turns down volume of the speaker greatly, the reception signal Rin, even when outputted from the guidance speech generation unit 95, is not reproduced from the speaker 91 at all or reproduced hardly. This means that there is a large change in the impulse response h'(k), so that it requires a large modification amount in the filter coefficient h(k) and it takes time for the convergence thereof. Therefore, the echo cancel performance is greatly deteriorated during that time.

It is therefore an object of the present invention to provide an echo canceller device that can exhibit the stable echo cancel performance even in cases (1) where immediately after a voice is uttered from a speaker, (2) where the noise is large, and (3) where a reception signal is outputted but it is not reproduced from the speaker at all or reproduced hardly.

DISCLOSURE OF THE INVENTION

The first echo canceller device according to the present invention is an echo canceller device that eliminates an echo signal generated when a voice reproduced from a speaker is captured by a microphone, which includes, provided that a signal reproduced from the speaker is defined as a first input signal and a signal including the echo signal is defined as a first objective signal;
  a first filter unit that generates a first output signal by filtering the first input signal with a filter coefficient;
  a first subtraction unit that inputs the first objective signal and the first output signal and outputs a first error signal that is a difference therebetween;
  an adaptation unit that modifies the filter coefficient based on an adaptation algorithm so that the first error signal becomes small;
  a first delaying unit that delays the first objective signal by a specific time period and outputs the signal as a second objective signal;
  a second delaying unit that delays the first input signal by the certain time period and outputs s the signal as a second input signal;
  a second filter unit that generates a second output signal by filtering the input signal with the filter coefficient that is modified by the adaptation unit; and
  a second subtraction unit that inputs the second objective signal and the second output signal and outputs a second error signal that is a difference therebetween.

The second echo canceller device according to the present invention is the first echo canceller device according to the present invention which further includes:
  a first noise suppression unit that suppresses a noise included in the first objective signal by adjusting a gain coefficient and outputs the first objective signal to the first subtraction signal; and
  a second noise suppression unit that performs noise suppression processing same as that of the first noise suppression unit on the first input signal by using the gain coefficient adjusted by the first noise suppression unit, and outputs the processed first input signal to the first filter unit and the adaptation unit.

The third echo canceller device according to the present invention is the first or the second echo canceller device according to the present invention which further includes an internal feedback unit that adds the first input signal to the first objective signal inputted to the first subtraction unit and the first delaying unit.

The first echo canceller device according to the present invention is structured to: delay the first objective signal by a certain time period to have the second objective signal; delay the first input signal by the certain time period to have the second input signal; generate the second output signal through filtering the second input signal by using the filter coefficient that has been converged after the specific time has passed; and acquire the second error signal from the second output signal and the second objective signal, so that it is possible to securely eliminate the echo signal included in the second error signal even immediately after the voice is uttered from the speaker, thereby making it possible to achieve the more stable echo canceling performance.

The second echo canceller device according to the present invention is provided with the first noise suppression unit and the second noise suppression unit, so that it is possible to acquire the filter coefficient even when the noise is large. Therefore, the stable echo cancelling performance can be achieved. In addition, through acquiring the filter coefficient by using the first objective signal on which noise suppression processing is performed and also cancelling the echo by using the second objective signal on which the noise suppression processing is not performed at the same time, the stable echo cancelling performance can be achieved while suppressing distortion of the speaker signal included in the second objective signal.

The third echo canceller device according to the present invention is provided with the internal feedback unit that adds the first input signal to the first objective signal inputted to the first subtraction unit and the first delaying unit, so that the echo signal included in the first objective signal is not lowered in a substantially extreme manner even when the reception signal is not reproduced from the speaker because the user conducts a mute operation or turns down the volume of the speaker. Therefore, the modification amount of the filter coefficient in such case can be decreased, so that the time required for convergence thereof can be shortened and the stable echo cancelling performance can be achieved.

BEST MODES FOR CARRYING OUT THE INVENTION

Figure 1:
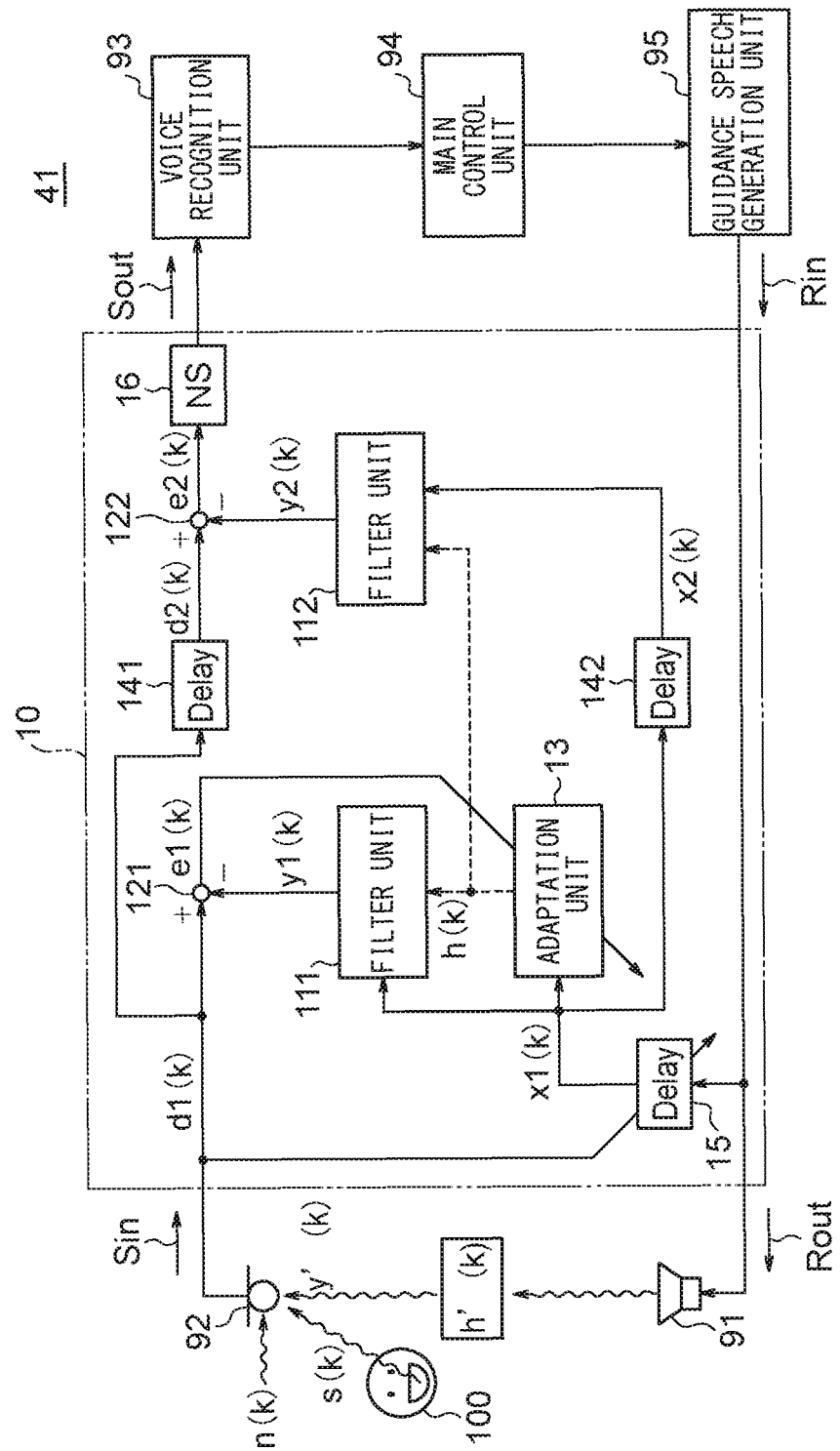
FIG. 1 is a block diagram showing an echo canceller device according to a first embodiment.

Hereinafter, modes for embodying the present invention (referred to as "embodiments" hereinafter) will be described by referring to the accompanying drawings. Note that same reference numerals are used for substantially the same structural elements in current Description and Drawings.

FIG. 1 is a block diagram showing an echo canceller device of a first embodiment. Hereinafter, explanations will be provided based upon the drawing.

The echo canceller device 10 of the first embodiment is mounted into a car navigation system 41. The navigation system 41 includes a speaker 91, a microphone 92, a voice recognition unit 93, a main control unit 94, a guidance speech generation unit 95, and the like. The navigation system 41 is in a same structure as that of the navigation system of Related Technique 1 except for the echo canceller device 10.

The echo canceller device 10 of the first embodiment eliminates an echo signal $y'(k)$ that is generated when a voice reproduced from the speaker 91 is captured by the microphone 92. Note here that a signal reproduced by the speaker 91 is defined as a first input signal $x1(k)$, and a signal including the echo signal $y'(k)$ is defined as a first objective signal $d1(k)$.

In this case, the echo canceller device 10 includes: a first filter unit 111 that generates a first output signal y1($k$) through filtering the first input signal x1($k$) with a filter coefficient h(k); a first subtraction unit 121 to which the first objective signal d1($k$) and the first output signal y1($k$) are inputted and from which a first error signal e1($k$) that is a difference therebetween is outputted; an adaptation unit 13 that modifies the filter coefficient h(k) based on an adaptation algorithm so that the first error signal e1($k$) becomes small; a first delaying unit 141 that delays the first objective signal d1($k$) by a specific time period τ and outputs it as a second objective signal d2($k$); a second delaying unit 142 that delays the first input signal x1($k$) by the specific time period τ and outputs it as a second input signal x2($k$); a second filter unit 112 that generates a second output signal y2($k$) through filtering the second input signal x2($k$) with the filter coefficient h(k) that is modified by the adaptation unit 13; and a second subtraction unit 122 to which the second objective signal d2($k$) and the second output signal y2($k$) are inputted and from which a second error signal e2($k$) that is a difference therebetween is outputted.

Further, the specific time period τ is set as the time until the filter coefficient h(k) is converged sufficiently (e.g., 100 ms). The echo canceller device 10 also includes: a delay adjustment unit 15 that adjusts the time difference between the first input signal x1($k$) and the first objective signal d1($k$); a noise suppression unit 16 that suppresses a noise n(k) and the like included in the second error signal e2($k$); and the like. Note, however, that the delay adjustment unit 15 and the noise suppression unit 16 may be omitted if the time difference therebetween and the noise n(k) are tolerated. Other structures of the echo canceller device 10 are the same as those of the echo canceller device of Related Technique 1.

Each unit of the echo canceller device 10 can be implemented within a computer (e.g., DSP) by a computer program, for example. The computer program may be recorded in a non-transitory storage medium such as an optical disk, a semiconductor memory, or the like. In that case, the computer program is read out from the storage medium and executed by the computer.

Next, operations of the echo canceller device 10 will be described.

The adaptation unit 13 modifies the filter coefficient h(k) so that the first output signal y1($h$) comes to be a signal similar to the first object signal d1($k$) and the power of the first error signal e1($k$) becomes small. The modification procedure of the filter coefficient h(k) is referred to as an adaptation algorithm and the filter coefficient h(k) is brought closer to the optimum coefficient ho based on the first input signal x1($k$) and the first error signal e1($k$) observed at each time k. At the operation start time k=0 of the adaptation unit 13, a proper initial value (e.g., h(0)=0) is given to the filter coefficient h(k). At each time k, the adaptation algorithm modifies the filter coefficient k(h) to h(k+1) and brings it closer to the optimum coefficient gradually as shown in a following expression (1).

$$h(k+1)=h(k)+\delta h(k) \quad (1)$$

In the above expression, δh(k) is called a modification vector that is an L-th order vector. As the adaptation algorithm, a learning identification method, an LMS algorithm, a projection algorithm, an RLS algorithm, and the like are known. In the first embodiment, the learning identification method is used.

A new filter coefficient h(k+1) is outputted to both of the first filter unit 111 and the second filter unit 112.

The first filter unit 111 generates a first output signal y1(k+1) according to a following expression (2) based on the first input signal x1(k+1) and the filter coefficient h(k+1) at the time k+1.

$$y1(k+1)=x1(k+1)*h(k+1) \quad (2)$$

Further, the first subtraction unit 121 determines the first error signal e1(k+1) at the time k+1 as in a following expression (3) based on the first objective signal d1(k+1) and the first output signal y1(k+1).

$$e1(k+1)=d1(k+1)-y1(k+1) \quad (3)$$

In the meantime, the second filter unit 112 generates a second output signal y2(k+1) according to a following expression (4) based on the second input signal x2(k+1) that is the first input signal x1(k+1) inputted with delay of the specific time period τ and the filter coefficient h(k+1+τ) at the time k+1+τ.

$$y2(k+1)=x2(k+1)*h(k+1+\tau) \quad (4)$$

Further, the second subtraction unit 122 determines the second error signal e2(k+1) at the time k+1 as in a following expression (5) based on the second objective signal d2(k+1) that is the first objective signal d1(k+1) inputted with delay of the specific time period τ and the second output signal y2(k+1).

$$e2(k+1)=d2(k+1)-y2(k+1) \quad (5)$$

Next, actions and effects of the echo canceller device 10 will be described.

As described above, the adaptation unit 13 requires a specific learning time for determining the optimum filter coefficient h(k). Thus, immediately after a guidance speech is uttered from the speaker 91, the filter coefficient h(k) is not converged yet. Therefore, the echo signal y'(k) may not be removed sufficiently from the error signal e1($k$) in some cases. For example, when there is no significant change in the impulse response h'(k) during the time between an end of a guidance speech and restart of a guidance speech, the filter coefficient h(k) is also converged promptly after the restart of the guidance speech. However, when there is a great change in the impulse response h'(k) during the time between an end of a guidance speech and restart of a guidance speech, the recognition rate is deteriorated due to the echo signal y'(k) included in the first error signal e1($k$) if voice recognition is done by using the first error signal e1($k$) as it is. Further, in a case of a first guidance speech after the echo canceller device 10 starts an operation, it may take a time until the filter coefficient h(k) is converged.

Thus, the echo canceller device 10 is structured to: delay the first objective signal d1($k$) by the specific time period τ to have the second objective signal d2($k$); delay the first input signal x1($k$) by the specific time period τ to have the second input signal x2($k$); generate the second output signal y2($k$) through filtering the second input signal x2($k$) by using the filter coefficient h(k) that has been converged after the specific time period τ has passed; and acquire the second error signal e2($k$) from the second output signal y2($k$) and the second objective signal d2($k$), so that it is possible to securely remove the echo signal y'(k) included in the second error signal e2($k$) even immediately after the voice is uttered from the speaker 91, thereby making it possible to achieve the more stable echo canceling performance.

Next, the echo canceller device 10 will be described once again in a different way.

The basic function of the echo canceller is to estimate the impulse response h'(k) that is a transfer function showing transfer of a voice (guidance speech) outputted from the speaker 91 that is propagated through the space and inputted to the microphone 92 based on the reception signal Rout outputted from the speaker 91 and the transmission signal Sin captured by the microphone 92. This estimation is done under a condition where there is no speaker signal s(k) from the user 100.

When the user 100 utters a voice for recognition under a state where there is a guidance speech outputted from the speaker 91, such voices are captured by the microphone 92. Then, through performing an arithmetic calculation estimating the impulse response h'(k) by the echo canceller device 10, the guidance speech component is eliminated and the voice of the user 100 is transferred to the voice recognition unit 93.

Estimation of the system is done by the learning identification method. The filter coefficient h(k) for implementing the transfer function is identified by following path fluctuation such as changes in the positions of the speaker 91 and the microphone 92, radical changes in the guidance speech from the speaker 91 and the external noise, etc.

At that time, the filter coefficient h(k) is determined with specific time of learning for a change in the system. Thus, since the system is not converged at an instant where the system is fluctuated, the echo signal y'(k) from the speaker 91 cannot be completely eliminated so that a residual echo is generated. That is, at the point of initial learning, the filter coefficient h(k) is being identified. Thus, more residual echo components are to remain.

As described, the filter coefficient h(k) is completely different from the filter coefficient which expresses the actual system state in the initial part of the transfer function identification, so that the residual echo is generated. In the meantime, the echo canceller device 10 is capable of decreasing the residual echo even in a case where there is almost no learning period such as a case where immediately after a guidance speech is uttered. Note here that identification of the adaptation filter is to be done in advance before starting calculation of the echo component in the adaptation filter. The first embodiment employs the structure with which the system identification part and the echo component calculation part are separated and echo cancelling can be done with a time difference. With such structure, the filter coefficient h(k) is in a value expressing the feature of the system even in the initial state of echo cancelling, so that the echo signal can be cancelled.

Figure 2:
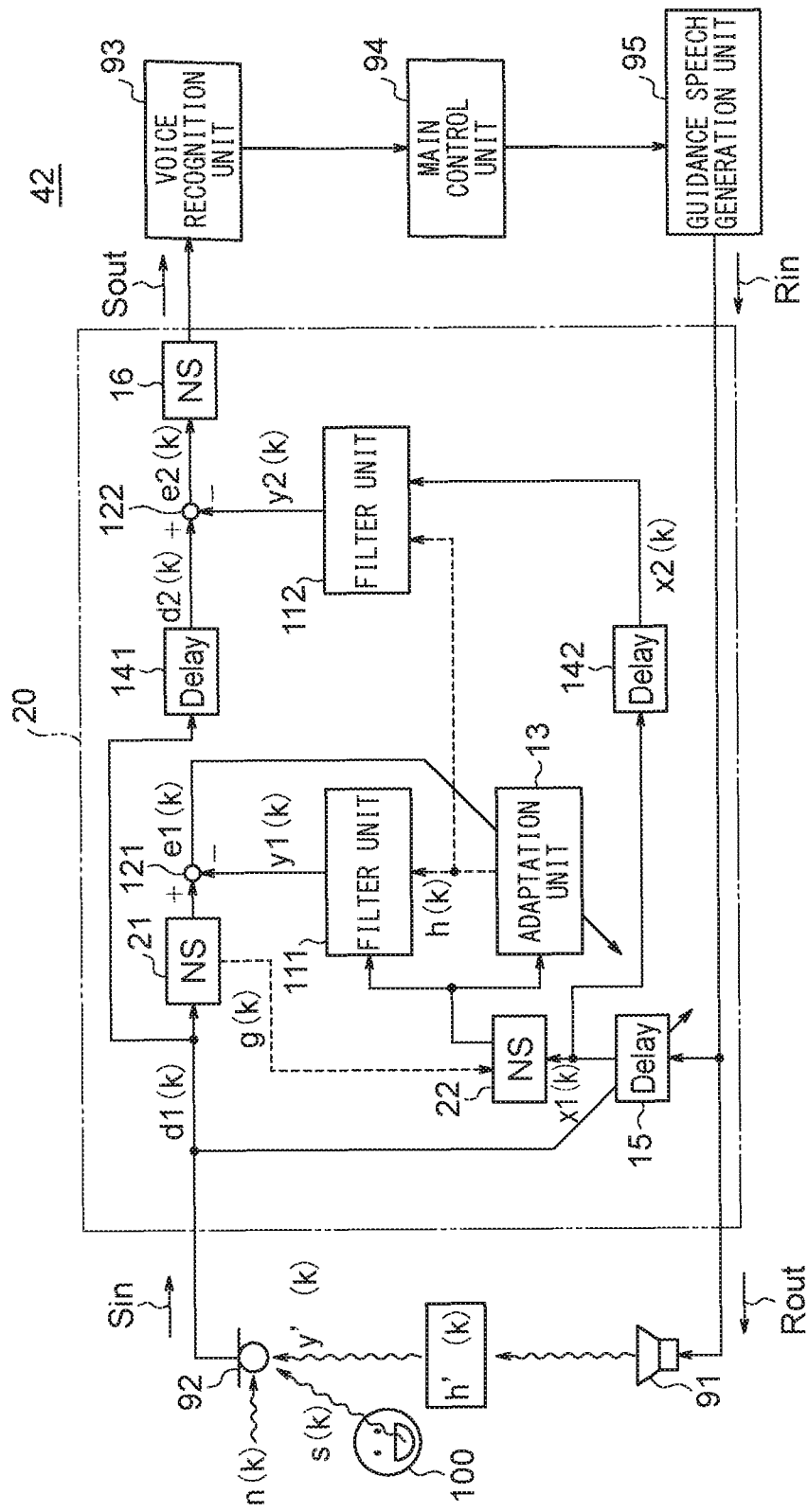
FIG. 2 is a block diagram showing an echo canceller device according to a second embodiment.

FIG. 2 is a block diagram showing an echo canceller device of a second embodiment. Hereinafter, explanations will be provided by referring to the drawing.

The echo canceller device 20 of the second embodiment is mounted into a car navigation system 42. The navigation system 42 is in a same structure as that of the navigation system of the first embodiment except for the echo canceller device 20.

The echo canceller device 20 further includes: a first noise suppression unit 21 that suppresses the noise n(k) included in the first objective signal $d1(k)$ by adjusting a gain coefficient g(k) and outputs it to the first subtraction unit 121; and a second noise suppression unit 22 that performs noise suppression processing same as that performed by the first noise suppression unit 21 on the first input signal $x1(k)$ by using the gain coefficient g(k) adjusted by the first noise suppression unit 21 and outputs the processed first input signal $x1(k)$ to the first filter unit 111 and the adaptation unit 13.

The first noise suppression unit 21 is a typical one that estimates the noise n(k) included in the first objective signal $d1(k)$ and determines the noise attenuation ratio (gain coefficient g(k)) for each frequency according to the noise n(k), which is a time variable filter having the gain coefficient g(k) that changes chronologically. The second noise suppression unit 22 is a time variable filter that uses the gain coefficient g(k) as it is adjusted by the first noise suppression unit 21. The reason for providing the second noise suppression unit 22 is to acquire the first output signal $y1(k)$ that is close to the noise-suppressed echo signal y'(k) through performing also on the first input signal $x1(k)$ the noise suppression processing same as that of the noise-suppressed echo signal y'(k). The second noise suppression unit 22 itself cannot estimate the noise n(k), so that it uses the gain coefficient g(k) adjusted by the first noise suppression unit 21.

As a specific example of the first noise suppression unit 21 and the second noise suppression unit 22, there is a type that estimates SNR (Speech Noise Ratio), corrects the suppression coefficient (gain coefficient g(k)) according to the SNR, and performs noise suppression by using the suppression coefficient (see Patent Literature 2).

Other structures of the echo canceller device 20 are the same as those of the echo canceller device of the first embodiment. Note, however, that the first delaying unit 141 and the second delaying unit 142 may be omitted.

Next, actions and effects of the echo canceller device 20 will be described.

The larger the noise n(k) becomes, the more difficult it becomes to acquire the filter coefficient h(k) that is the estimated value of the impulse response h'(k). Thus, the first noise suppression unit 21 is placed at a previous stage of the first subtraction unit 121 and the second noise suppression unit 22 is placed at a previous stage of the first filter unit 111 and the adaptation unit 13 so as to be able to acquire the filter coefficient h(k) by suppressing the noise n(k) included in the first objective signal $d1(k)$.

Figure 5:
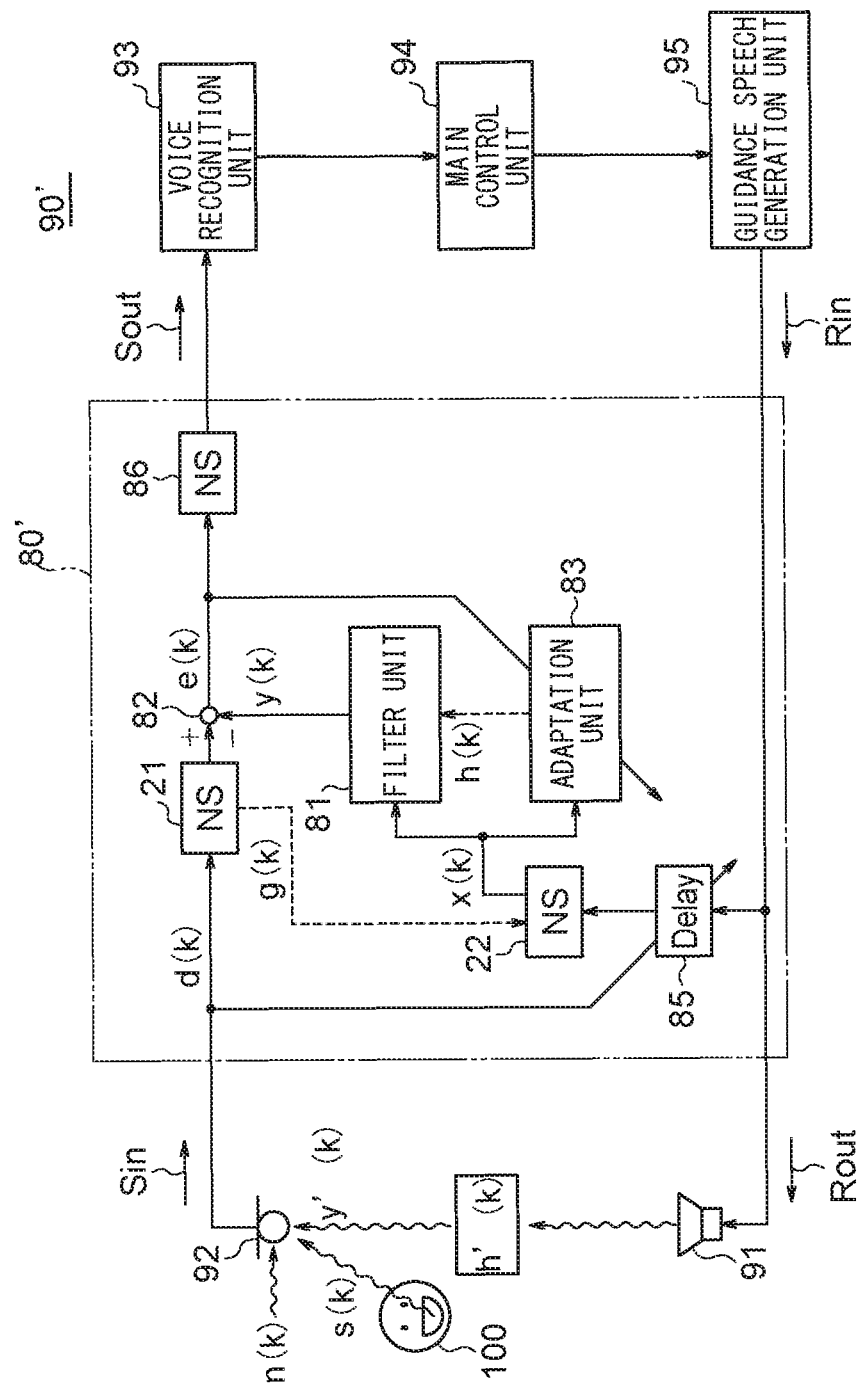
FIG. 5 is a block diagram showing an echo canceller device according to Comparative Example 1.

In the meantime, an echo canceller device 80' and a navigation system 90' of Comparative Example 1 shown in FIG. 5 are types structured by providing the first noise suppression unit 21 and the second suppression unit 22 of the second embodiment to the echo canceller device and the navigation system of Related Technique 1. With this structure, the filter coefficient h(k) can be acquired even if the noise h(k) is large. However, the voice recognition rate is deteriorated due to the distortion generated in the speaker signal s(k) included in the error signal e(k). This is because noise suppression processing also happens to be performed on the speaker signal s(k) included in the objective signal d(k) by the first noise suppression unit 21.

Thus, in addition to the first filter unit 111 that acquires the filter coefficient h(k) by using the first objective signal $d1(k)$ on which the noise suppression processing is done, the second embodiment is designed to include the second filter unit 112 for performing echo cancelling by using the second objective signal $d2(k)$ that is not subjected to the noise suppression processing so that distortion is not generated in the speaker signal s(k) included in the second error signal $e2(k)$.

As described, because the first noise suppression unit 21 and the second noise suppression unit 22 are provided, the echo canceller device 20 can acquire the filter coefficient h(k) even if the noise n(k) is large. Therefore, a stable echo cancelling performance can be achieved. In addition, through acquiring the filter coefficient by using the first objective signal $d1(k)$ on which noise suppression processing is done and also through performing echo cancelling by using the second objective signal $d2(k)$ on which the noise suppression processing is not performed, it becomes possible to achieve a stable echo cancelling performance while suppressing distortion of the speaker signal s(k) included in the second objective signal d2(k). Other actions and effects of the echo canceller device 20 of the second embodiment are the same as those of the echo canceller device of the first embodiment.

Next, the echo canceller device 20 will be described once again in a different way.

It is supposed that a large disturbance noise is generated in the estimation of the system until the guidance speech from the speaker 91 is inputted to the microphone 92. In such case, when the guidance speech level from the speaker 91 is higher than the disturbance noise level, the estimation can be done even though the precision of the impulse response h'(k) as the transfer function is deteriorated. Therefore, the echo cancelling can function. At this time, while the signal from which the echo is cancelled includes the disturbance noise component, the disturbance noise component is attenuated by the noise suppression unit 16 and the speaker voice is transferred to the voice recognition unit 93.

However, in a case where the disturbance noise is larger than the guidance speech outputted from the speaker 91 and the guidance speech is buried in the noise, it is almost impossible to estimate the transfer function with which the voice signal reaches the microphone 92.

Thus, in order to overcome such state where the guidance speech is buried in the disturbance noise, the first noise suppression unit 21 is placed in a previous stage of the echo canceller structure for lowering the disturbance noise level than the guidance speech level from the speaker 91 to acquire the transfer function. At that time, the second noise suppression unit 22 is also provided so as to cancel the influence of the first noise suppression unit 21.

A state where a guidance speech from the speaker 91 is being uttered and there is no voice uttered from the user 100 is referred to as "single talk", and a state where there is a voice uttered from the user 100 while a guidance speech is being uttered from the speaker 91 is referred to as "double talk".

Looking at Comparative Example 1 shown in FIG. 5, while the noise is eliminated from the voice signal on which the noise suppression processing is done by the first noise suppression unit 21 and the second noise suppression unit 22, the qualities of the remaining voice are different in a single talk period and a double talk period. That is, in the double talk period, the spectrum is not regenerated accurately and deterioration is generated in the voice so that the voice quality of the output of the echo canceller is also deteriorated. Therefore, the voice recognition rate using the transmission signal Sout is deteriorated.

The causes for the deterioration are as follows. In the echo canceller processing, a prediction signal created based on the accurate (including the phase) transfer function acquired by system identification is subtracted when eliminating the echo component. In the meantime, the noise is estimated by using the statistical characteristic of the signal and it is subtracted in the noise suppression processing. Thus, the precision thereof is not as good as that of the prediction of the echo canceller. That is, the statistical model under the double talk state is not assumed in the noise suppression processing. So, when the echo canceller processing is performed on the voice signal on which the noise suppression processing is done, the sound quality at the time of double talk is deteriorated. This deteriorates the voice recognition rate.

Therefore, the second embodiment is designed to use the signal on which the noise suppression processing is done only for identification processing of the echo canceller and to use the signal on which the noise suppression processing is not done for echo cancelling processing to improve the voice recognition rate by securing the quality of the voice outputted from the echo canceller at the time of double talk.

As described above, when the echo canceller processing is performed on the voice signal on which the noise suppression processing is done, the sound quality at the time of double talk is deteriorated so that the voice recognition rate is deteriorated. In order to overcome such issue, the second embodiment is structured to use the signal, from which the disturbance noise is suppressed by performing the noise suppression processing, for the identification processing for calculating the adaptation filter coefficient and to use the original signal on which the noise suppression processing is not done for the echo cancel processing, so that deterioration in the voice quality at the time of double talk can be suppressed. The structure of FIG. 2 is the time shift echo cancel system of the first embodiment to which the double-talk quality deterioration suppression system of the second embodiment is employed.

Figure 3:
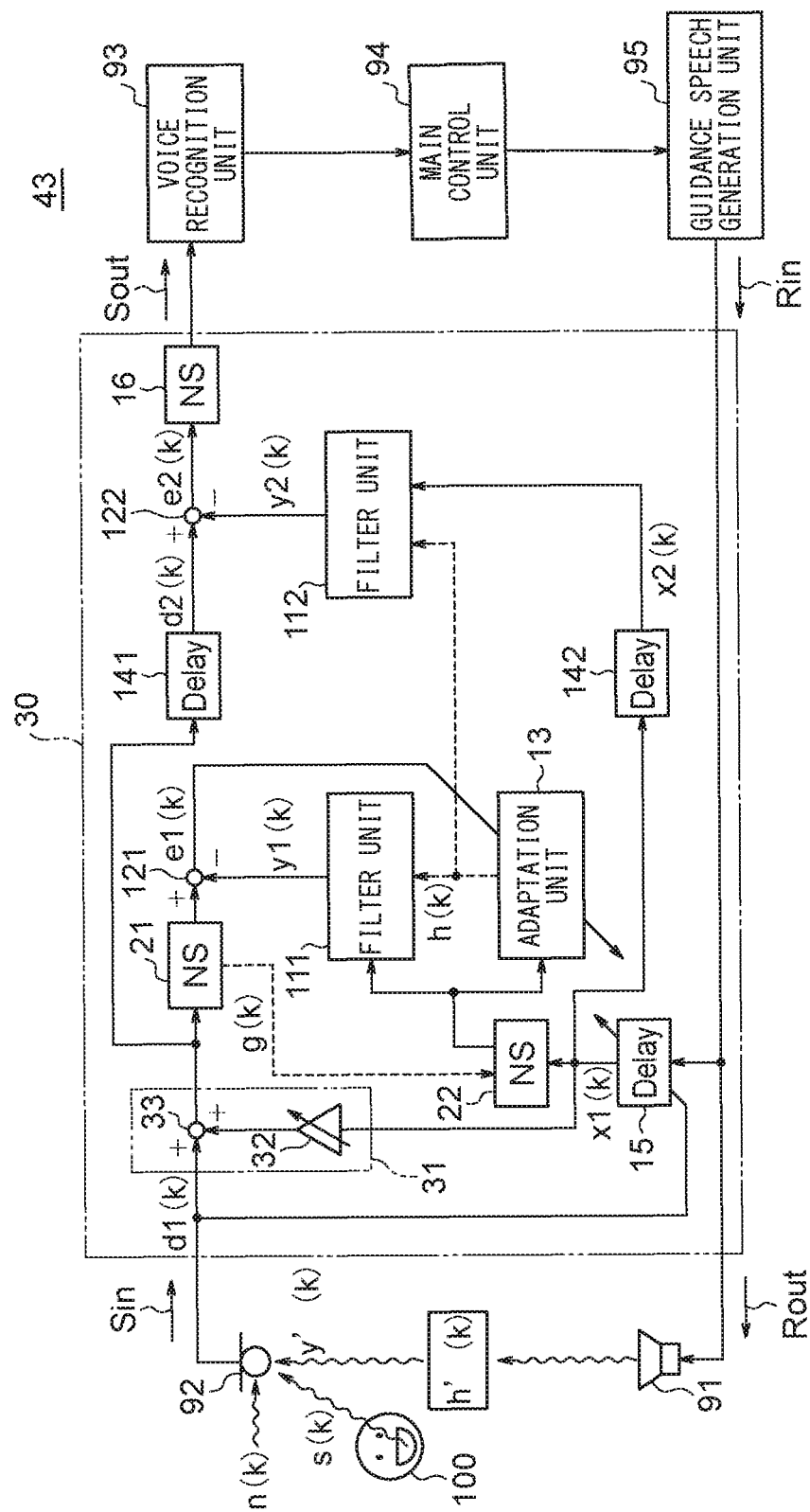
FIG. 3 is a block diagram showing an echo canceller device according to a third embodiment.
Figure 4:
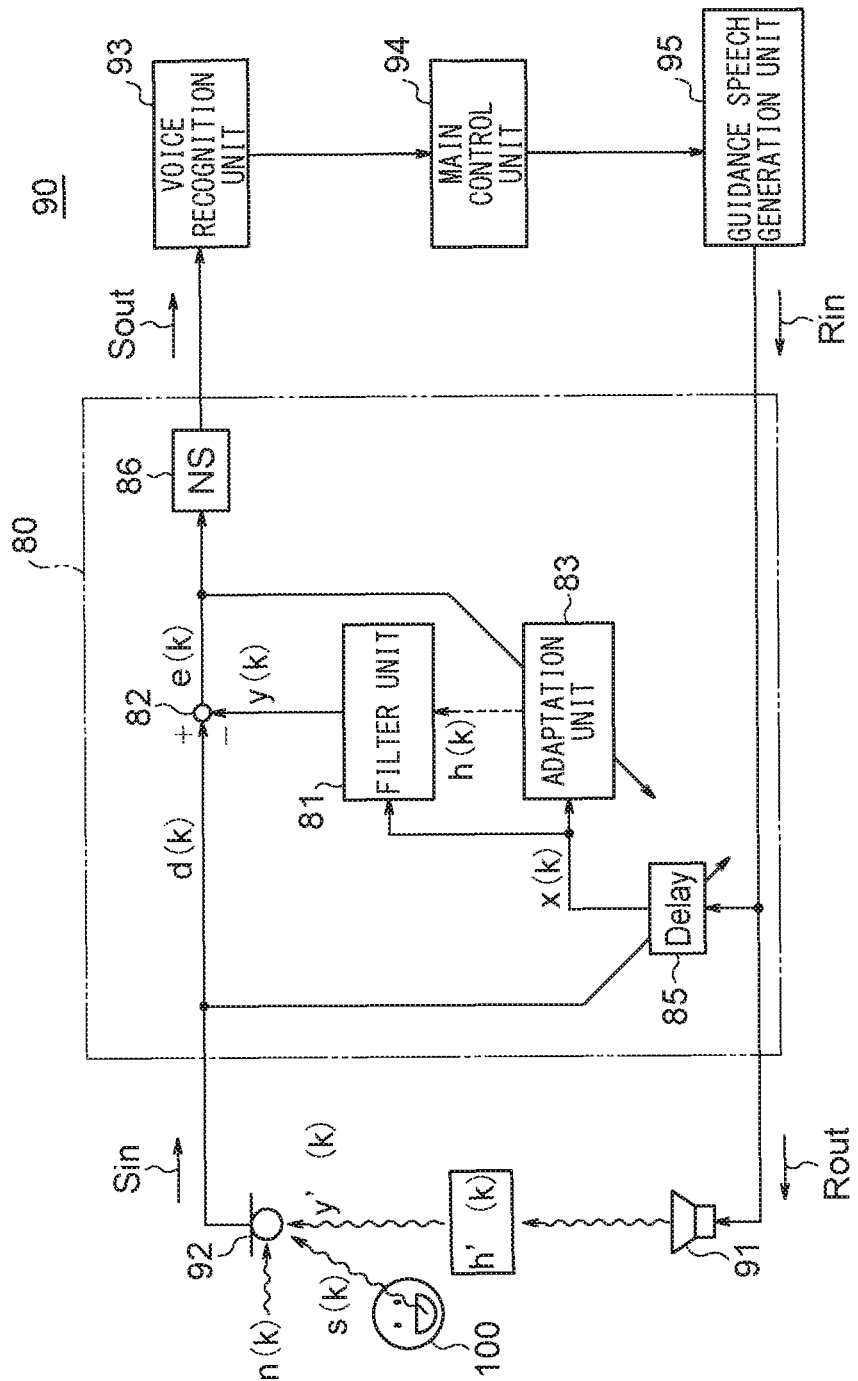
FIG. 4 is a block diagram showing an echo canceller device according to Related Technique 1.

FIG. 3 is a block diagram showing an echo canceller device of a third embodiment. Hereinafter, explanations will be provided by referring to the drawing.

The echo canceller device 30 of the third embodiment is mounted into a car navigation system 43. The navigation system 43 is in a same structure as that of the navigation system of the first embodiment or the second embodiment except for the echo canceller device 30.

The echo canceller device 30 further includes an internal feedback unit 31 that adds the first input signal x1(k) to the first objective signal d1(k) inputted to the first subtraction unit 121 and the first delaying unit 141. The internal feedback unit 31 includes: an amplifier 32 that attenuates or amplifies the first input signal x1(k) with a specific gain; and an adder 33 that adds the first input signal x1(k) attenuated or amplified by the amplifier 32 to the first objective signal d1(k).

Other structures of the echo canceller device 30 are the same as those of the echo canceller device of the second embodiment. Note, however, that the first delaying unit 141, the second delaying unit 142, the second filter unit 112, the second subtraction unit 122, the first noise suppression unit 21, and the second suppression unit 22 may be omitted.

Next, actions and effects of the echo canceller device 30 will be described.

The echo canceller device 30 is designed to include the internal feedback unit 31 that adds the first input signal x1(k) to the first objective signal d1(k) inputted to the first subtraction unit 121 and the first delaying unit 141, so that the echo signal y'(k) practically included in the first objective signal d1(k) is not decreased extremely even in a case where the user 100 conducts a mute operation or turns down the speaker volume greatly so that the reception signal Rout is not reproduced from the speaker 91. Therefore, the modification amount of the filter coefficient h(k) in such case can be decreased. This makes it possible to shorten the time required for the convergence thereof and to achieve a stable echo cancelling performance. Other actions and effects of the echo canceller device 30 of the third embodiment are the same as those of the echo canceller device of the second embodiment.

Next, the echo canceller device 30 will be described once again in a different way.

In a case where the user 100 in the car conducts a mute operation or an operation for turning down the volume completely, for example, there is a radical change generated in the transfer function, so that the modification amount of the filter coefficient h(k) is increased and completely different convergence processing is to be required. In a case of returning from such state, it takes time for convergence since the modification amount of the filter coefficient h(k) is large so that the echo cancelling performance during that time is deteriorated greatly. Therefore, the third embodiment is designed to keep the echo canceller output stable even when there is a radical change in the sound environment, e.g., when the output from the speaker 91 is muted while a guidance speech is uttered from the speaker 91.

The third embodiment is designed to include the internal feedback unit 31 so as to decrease the modification amount of the filter coefficient h(k) for the fluctuation of the echo path to improve the following performance thereof. Thereby, stability of the operation of the echo canceller is secured even in a peculiar state such as muting that is an operation that may occur normally.

The internal feedback unit 31 adds a reference signal (the first input signal x1(k)) after adjusting delay time internally to the first objective signal d1(k) inputted from the microphone 92 in parallel to the echo return path by the sound system. Thereby, the echo return loss does not turn out as $-\infty$ but simply changes by several decibels even in a case where a mute operation of the speaker 91 is done, so that the modification amount of the filter coefficient h(k) in such case is small. The signal given by the internal feedback is simple delay and can be eliminated completely by the echo canceller, so that it does not appear in the output.

While the present invention has been described above by referring to each of the embodiments, the present invention is not limited only to each of the embodiments described above. Various changes and modifications occurred to those skilled in the art can be applied to the structures and the details of the present invention. Further, the present invention includes a part of or a whole part of the structures of each of the embodiments combined mutually as appropriate.

While a part of or a whole part of the embodiments can be summarized as follows as in following Supplementary Notes, the present invention is not necessarily limited only to the following structures.

(Supplementary Note 1)

An echo canceller device that eliminates an echo signal generated when a voice reproduced from a speaker is captured by a microphone, which includes, provided that a signal reproduced from the speaker is defined as an input signal and a signal including the echo signal is defined as an objective signal;
- a first noise suppression unit that suppresses a noise included in the objective signal by adjusting a gain coefficient;
- a second noise suppression unit that performs noise suppression processing same as that of the first noise suppression unit on the input signal by using the gain coefficient adjusted by the first noise suppression unit;
- a first filter unit that generates a first output signal by filtering, with a filter coefficient, the input signal on which the noise suppression processing is performed;
- a first subtraction unit to which the objective signal on which the noise suppression processing is performed and the first output signal are inputted and from which a first error signal that is a difference therebetween is outputted;
- an adaptation unit that modifies the filter coefficient based on an adaptation algorithm so that the first error signal becomes small;
- a second filter unit that generates a second output signal by filtering, with the filter coefficient that is modified by the adaptation unit, the input signal on which the noise suppression processing is not performed; and
- a second subtraction unit to which the objective signal on which the noise suppression processing is not performed and the second output signal are inputted and from which a second error signal that is a difference therebetween is outputted.

(Supplementary Note 2)

An echo canceller device that eliminates an echo signal generated when a voice reproduced from a speaker is captured by a microphone, which includes, provided that a signal reproduced from the speaker is defined as an input signal and a signal including the echo signal is defined as an objective signal;
- a filter unit that generates an output signal by filtering the input signal with a filter coefficient;
- a subtraction unit to which the objective signal and the output signal are inputted and from which an error signal that is a difference therebetween is outputted;
- an adaptation unit that modifies the filter coefficient based on an adaptation algorithm so that the error signal becomes small; and
- an internal feedback unit that adds the input signal to the objective signal inputted to the subtraction unit.

INDUSTRIAL APPLICABILITY

The echo canceller device according to the present invention can be used not only for the navigation system described above but also for hands free use of mobile phones and conventional wired phones and for interactive communication utilizing speakers and microphones used in Web meeting systems on the Internet.

REFERENCE NUMERALS (First Embodiment)
- 10 Echo canceller device
- 111 First filter unit
- 112 Second filter unit
- 121 First subtraction unit
- 122 Second subtraction unit
- 13 Adaptation unit
- 141 First delaying unit
- 142 Second delaying unit
- 15 Delay adjustment unit
- 16 Noise suppression unit
- 41 Navigation system
- 91 Speaker
- 92 Microphone
- 93 Voice recognition unit
- 94 Main control unit
- 95 Guidance speech generation unit
- 100 User
- y'(k) Echo signal
- x1(k) First input signal
- x2(k) Second input signal
- d1(k) First objective signal
- d2(k) Second objective signal
- h(k) Filter coefficient
- y1(k) First output signal
- y2(k) Second output signal
- e1(k) First error signal
- e2(k) Second error signal
- s(k) Speaker signal n(k) Noise
h'(k) Impulse response
Sin, Sout Transmission signal
Rin, Rout Reception signal
(Second Embodiment)
 20 Echo canceller device
 21 First noise suppression unit
 22 Second noise suppression unit
 42 Navigation system
(Third Embodiment)
 30 Echo canceller device
 31 Internal feedback unit
 32 Amplifier
 33 Adder
 43 Navigation system
(Related Technique 1)
 80 Echo canceller device
 81 Filter unit
 82 Subtraction unit
 83 Adaptation unit
 85 Delay adjustment unit
 86 Noise suppression unit
 90 Navigation system
 x(k) Input signal
 d(k) Objective signal
 y(k) Output signal
 e(k) Error signal
(Comparative Example 1)
 80' Echo canceller device
 90' Navigation system

The invention claimed is:

1. An echo canceller device that eliminates an echo signal generated when a voice reproduced from a speaker is captured by a microphone, the echo canceller device comprising, provided that a signal reproduced from the speaker is defined as a first input signal and a signal including the echo signal is defined as a first objective signal:
   a first filter that generates a first output signal by filtering the first input signal with a filter coefficient;
   a first subtractor to which the first objective signal and the first output signal are inputted and from which a first error signal that is a difference therebetween is outputted;
   an adapter that continues to modify the filter coefficient based on an adaptation algorithm that reduces the magnitude of the first error signal;
   a first delayer that delays the first objective signal by a specific time period and outputs the signal as a second objective signal;
   a second delayer that delays the first input signal by the certain time period and outputs the signal as a second input signal;
   a second filter that generates a second output signal by filtering the input signal with the filter coefficient that is modified by the adapter; and
   a second subtractor to which the second objective signal and the second output signal are inputted and from which a second error signal that is a difference therebetween is outputted.

2. The echo canceller device as claimed in claim 1, further comprising:
   a first noise suppressor that suppresses a noise included in the first objective signal by adjusting a gain coefficient and outputs to the first subtraction signal; and
   a second noise suppressor that performs noise suppression processing same as that of the first noise suppressor on the first input signal by using the gain coefficient adjusted by the first noise suppressor, and outputs the processed first input signal to the first filter and the adapter.

3. The echo canceller device as claimed in claim 1, further comprising:
   an internal feedback device that adds the first input signal to the first objective signal inputted to the first subtractor and the first delayer.

4. A navigation system, comprising:
   the echo canceller device as claimed in claim 1,
   wherein a guidance speech is reproduced from the speaker.

5. The echo canceller device as claimed in claim 2, further comprising:
   an internal feedback device that adds the first input signal to the first objective signal inputted to the first subtractor and the first delayer.

6. A navigation system, comprising:
   the echo canceller device as claimed in claim 2,
   wherein a guidance speech is reproduced from the speaker.

7. A navigation system, comprising:
   the echo canceller device as claimed in claim 3,
   wherein a guidance speech is reproduced from the speaker.

8. A navigation system, comprising:
   the echo canceller device as claimed in claim 4,
   wherein a guidance speech is reproduced from the speaker.

9. A navigation system, comprising:
   the echo canceller device as claimed in claim 5,
   wherein a guidance speech is reproduced from the speaker.

* * * * *